Sept. 6, 1938.   E. L. McINTYRE   2,129,067
ROD LINE COUPLER
Filed April 2, 1938   3 Sheets-Sheet 1
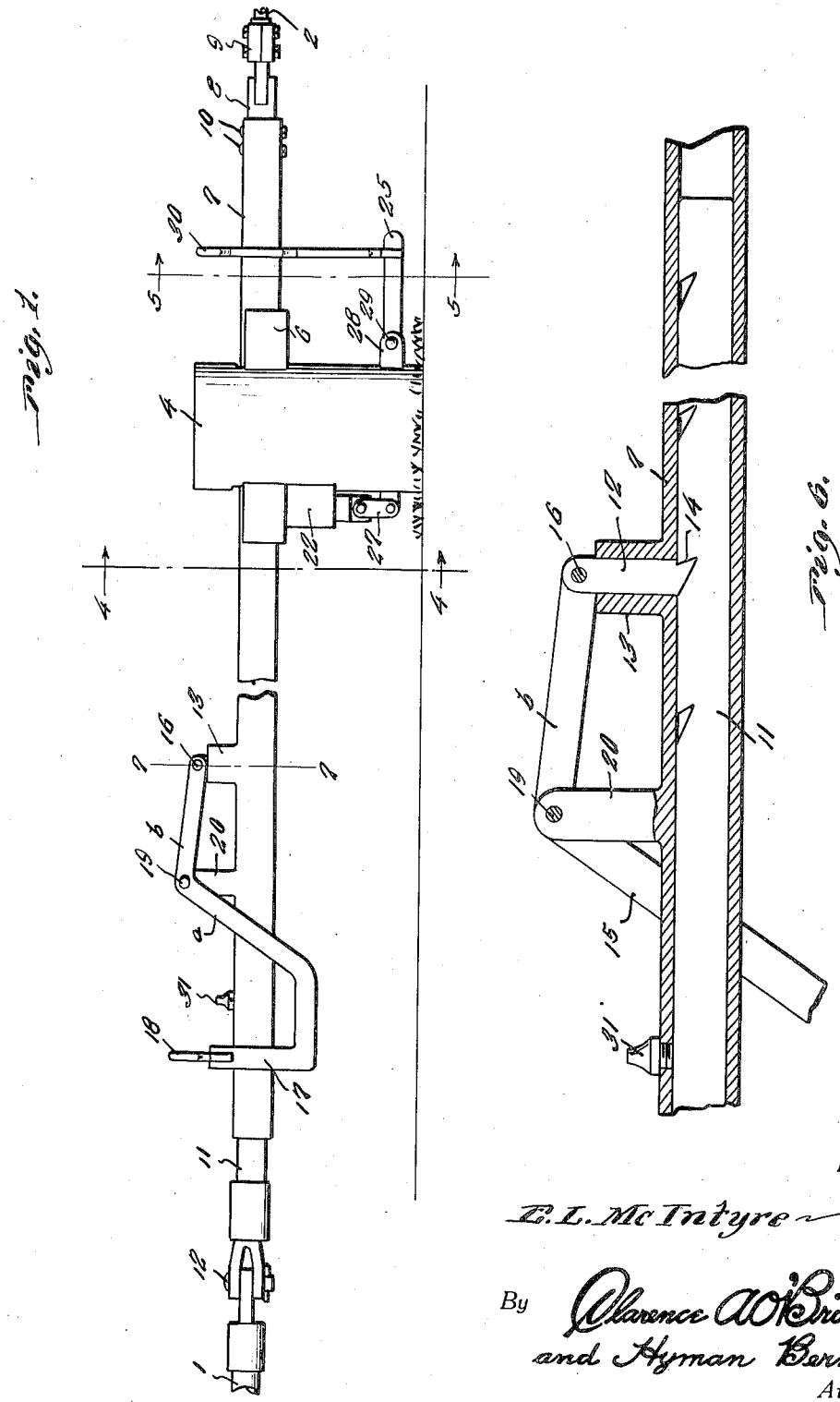
Inventor
E. L. McIntyre
By Clarence A. O'Brien
and Hyman Berman
Attorneys Sept. 6, 1938.   E. L. McINTYRE   2,129,067
ROD LINE COUPLER
Filed April 2, 1938   3 Sheets-Sheet 2
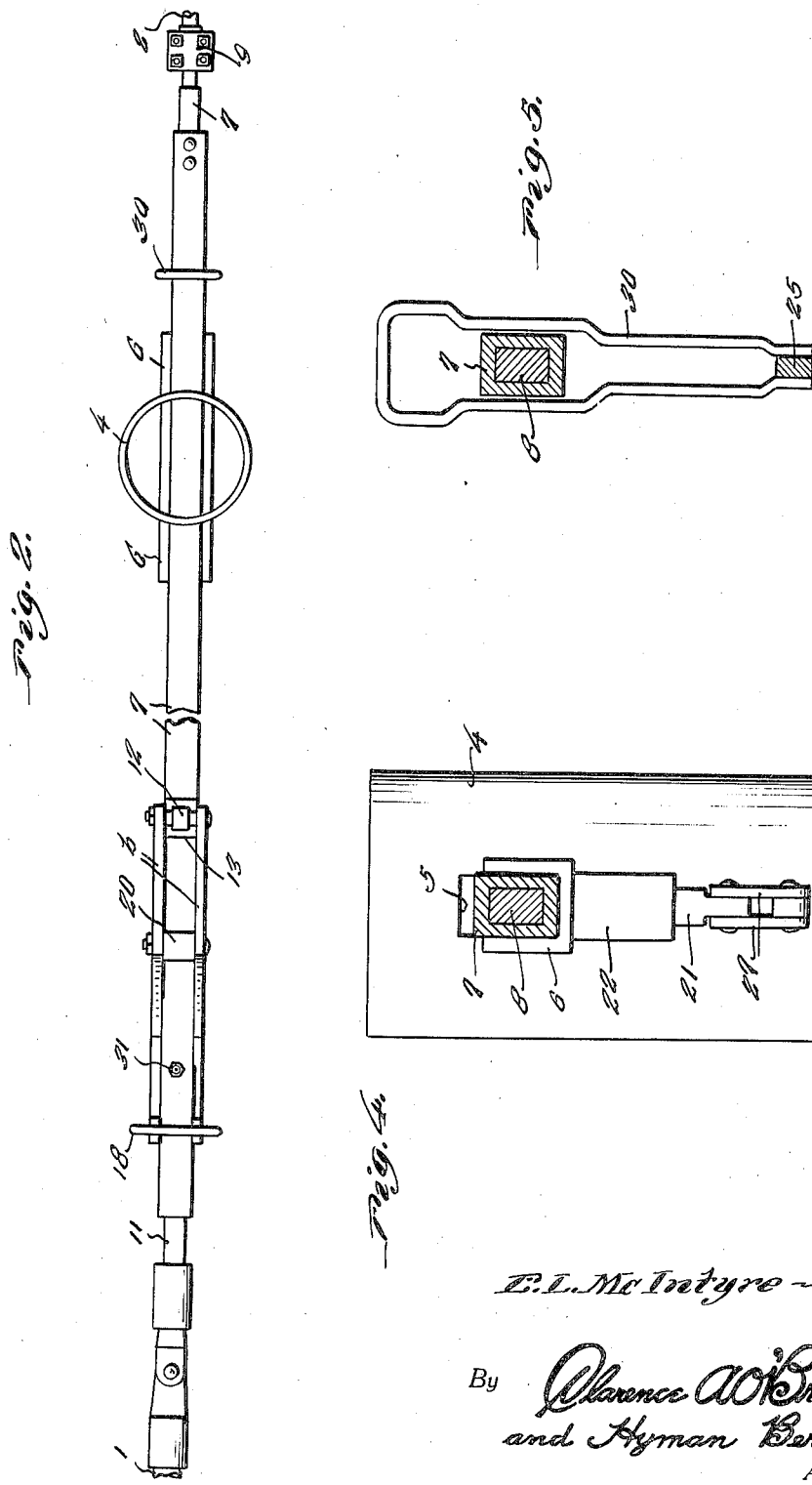
Inventor
E. L. McIntyre
By Clarence A. O'Brien
and Hyman Berman
Attorneys

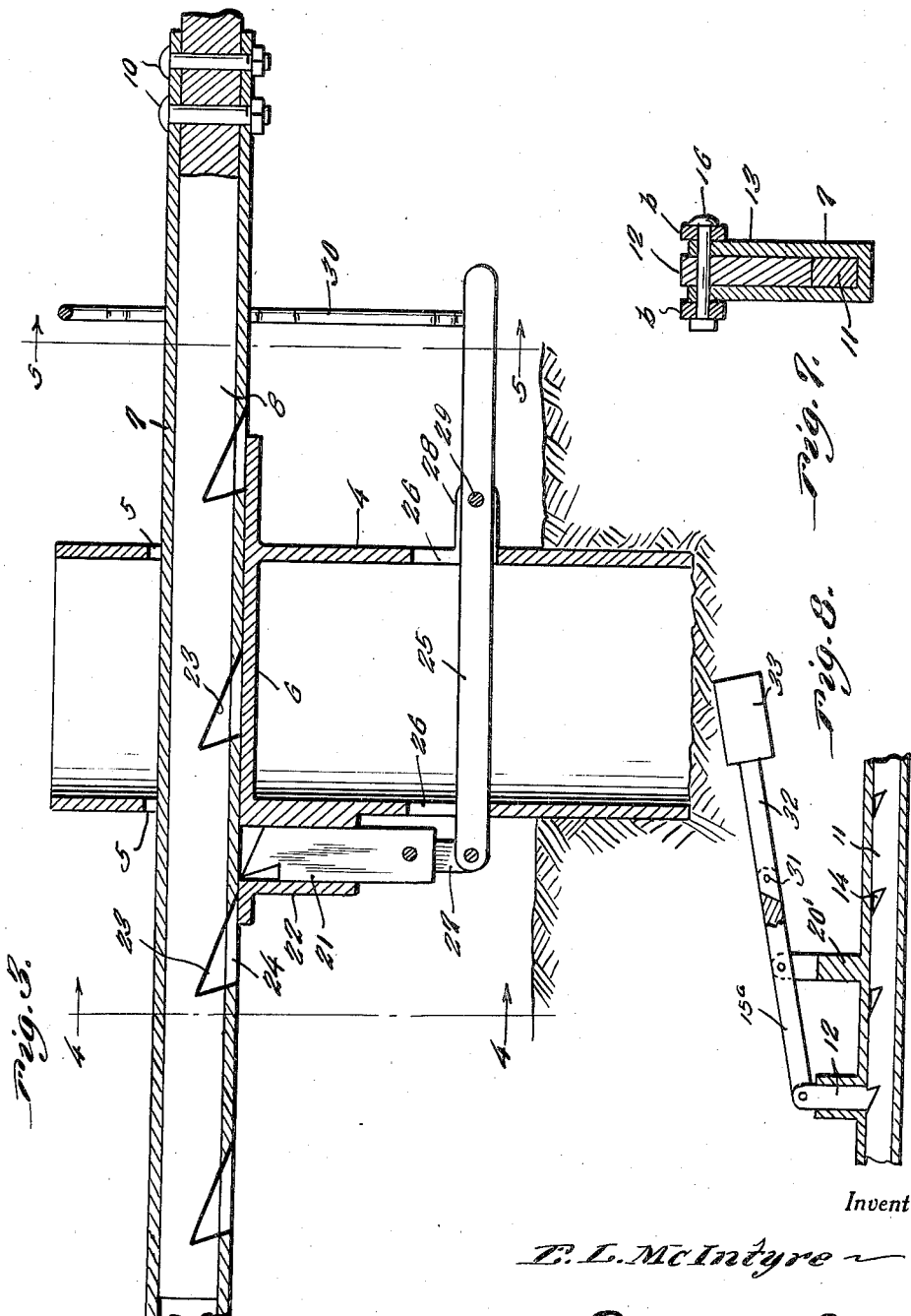

Patented Sept. 6, 1938

2,129,067

UNITED STATES PATENT OFFICE 2,129,067

ROD LINE COUPLER

Ernest Lee McIntyre, Sapulpa, Okla.

Application April 2, 1938, Serial No. 199,696

5 Claims. (Cl. 74—593)

This invention relates to a safety coupling device for a power rod line for operating a pump jack, and an object of the invention is to provide a device of the character mentioned whereby the coupling may be easily and quickly engaged by simply throwing dogs into and out of operative position.

The invention together with its objects and advantages will be best understood from a study of the following description taken in connection with the accompanying drawings wherein:—

Figure 1 is a side elevational view of the coupler,

Figure 2 is a top plan view thereof,

Figure 3 is an enlarged detail sectional view through a portion of the coupler and the knock-off post, Figures 4, 5, and 7 are vertical sectional views taken substantially on the lines 4—4, 5—5 and 7—7, respectively, of Figure 1, Figure 6 is a fragmentary longitudinal sectional view illustrating certain details hereinafter more fully referred, and Figure 8 is a fragmentary detail sectional view illustrating a slightly modified form of the invention.

Referring to the drawings by reference numerals, it will be seen that 1 represents a portion of a power rod line connected to the pump jack while 2 indicates the rod that is connected to the power.

The knock-off post is indicated by the reference numeral 4.

In accordance with the present invention the knock-off post 4 is provided adjacent the upper end thereof with openings 5 in diametrically opposite portions thereof. Formed integral with the post 4 is a channel-shaped guide member 6 the opposite ends of which project beyond diametrically opposite sides of the post 4 in alignment with the openings 5.

The guide 6 slidably accommodates a tubular coupler rod or sleeve 7.

Fitted in the power end of the rod 7 is a bar 8 that is of the same cross-sectional shape as the rod 7 and the bar 8 at one end thereof is connected in a conventional manner and as indicated at 9 with the power rod 2. The rod 8 is secured against movement relative to the sleeve or rod 7 through the medium of bolts 10 as clearly shown in Figure 3.

Slidably accommodated within the power jack end of the tubular member 7 is a rod or bar 11 and the same at one end thereof is connected with the rod line 1 in any suitable manner as indicated generally at 12.

For coupling the rod 11 to the tubular sleeve or rod 7 so that said rod 7 and rod 11 will reciprocate as a unit, there is provided a vertically shiftable dog 12 that operates in a vertical guide 13 provided therefor on the member 7. The inner end of the dog 12 is adapted to engage in a selected one of a plurality of notches 14 provided therefor in the rod 11 as shown in Figure 6 whereby to couple rods 7 and 11 together.

An operating lever for the dog 12 is provided and in the form of the invention shown in Figures 1 to 7 inclusive the same comprises a pair of substantially Z or angular side bars 15 that at one end are pivoted as at 16 to the dog 12 and at an opposite end have vertical portions 17 connected by a substantially U-shaped handle 18. In the form of the invention shown in Figure 8, the operating lever for the dog 12 is indicated by the reference numeral 15a and is pivoted at one end to the dog 12 and at an opposite end to the bifurcated post 20'. Adjacent said pivoted end the lever 15a is bifurcated and has pivoted within the furcation thereof as at 31 one end of a handle 32 that is provided on its outer end with a weight 33. At the pivoted end thereof handle 32, and at the bifurcated end thereof lever 15a are complementarily formed as shown to limit swinging movement of the handle 32 in one direction to a position aligning with the lever 15a. The weight-equipped handle 32 may be swung vertically upwardly into a substantially inoperative position when desired.

At the angle between the portions a—b thereof the members 15 of said lever are pivoted as at 19 to a post 20 also rising from the member 7.

For releasably securing the member 7 against reciprocatory movement there is provided a vertically shiftable dog 21 that operates in a suitable guide 22 provided therefor at one end of the channel guide 6, guide 22 being integral with the knock-off post 4 and channel guide 6 as clearly shown in Figures 3 and 4.

To cooperate with the upper end of the dog 21, the bar 8 is provided with a longitudinal series of relatively spaced notches 23 arranged in registry with openings 24 provided in the underside of the member 7. Obviously with an opening 24 in alignment with guide 22 upward movement of the dog 21 will cause the dog to pass through the opening 24 and to engage a notch 23 whereby to hold the member 7 against reciprocatory movement.

For raising and lowering the dog 21 there is provided an operating lever 25 that works in suitable openings 26 provided therefor in opposite sides of the knock-off post 4. Lever 25 is pivotally connected at one end thereof to the dog 21 though the medium of a link 27 while intermediate its ends lever 25 is pivoted to ears 28 formed integral with the post 4 as at 29.

At the free end thereof the lever 25 is provided with a vertically disposed handle 30 that straddles the member 7 as clearly shown in Figures 3 and 5.

As is believed to be apparent the jack is connected in the rod line when dog 12 is engaged in notch 14 of the rod 11 and the dog 21 is in the release position shown in Figure 3.

When operation is to be discontinued, the operator pushes down on the handle 18 thus causing the dog 12 to raise upwardly out of engagement with a notch 14 while at the same time the operator pushes down on the handle 30 causing the dog 21 to move upwardly and as an opening 24 comes into alignment with the guide 22 to move through the opening 24 and into engagement with a notch 23 thus arresting further movement of the member 7 while the member 11, connected with the pump jack, is then free to reciprocate relative to the member 7.

For the purposes of maintaining the member 11 in well lubricated condition the tubular member 7 is provided with a suitable grease fitting 31 as shown in Figure 6.

It is thought that a clear understanding of the construction, utility and advantages of an invention of this character will be had without a more detailed description.

Having thus described the invention what is claimed as new is:—

1. In a surface rod line jack, a tubular member, means for connecting the tubular member with a power pull rod, a rod adapted to have one end connected to the rod line and having a second end slidably received within said tubular member, said last-named rod having the end thereof within said tubular member provided with a notch, a guide carried by said tubular member, and a dog working in said guide and having an end arranged to engage in said notch for coupling said tubular member and the last-named rod together, said tubular member also having fixed in one end thereof a member provided with a notch, and said tubular member being provided with an opening in alignment with said notch, and a relatively stationary vertically shiftable dog movable through the opening in said tubular member into and out of engagement with the last-mentioned notch, as and for the purpose specified.

2. In a coupling device for connecting and disconnecting a power rod line, and in combination with a knock-off post, a guide member fixedly mounted on said knock-off post, a tubular member slidably fitting in said guide member, a rod having one end fixed within said tubular member and provided at said end with a notch, and said tubular member having an opening therein aligning with said notch, a perpendicular guide sleeve mounted on said knock-off post in alignment with the opening in said tubular member, a dog vertically slidable in said last-mentioned guide and movable upwardly through said opening and into engagement with said notch for securing said tubular member against reciprocatory movement, a lever pivotally mounted on the knock-off post, means operatively connecting one end of said lever with said dog, and a handle for said lever straddling said tubular member.

3. In a coupling device for connecting and disconnecting a power rod line, and in combination with a knock-off post, a guide member fixedly mounted on said knock-off post, a tubular member slidably fitting in said guide member, a rod having one end fixed within said tubular member and provided at said end with a notch, and said tubular member having an opening therein aligning with said notch, a perpendicular guide sleeve mounted on said knock-off post in alignment with the opening in said tubular member, a dog vertically slidable in said last-mentioned guide and movable upwardly through said opening and into engagement with said notch for securing said tubular member against reciprocatory movement, a lever pivotally mounted on the knock-off post, means operatively connecting one end of said lever with said dog, and a handle for said lever straddling said tubular member, a rod having one end slidably fitting in said tubular member and having the other end thereof adapted to be connected to a pump jack, said last-mentioned rod being also provided in the first-named end thereof with a notch, a fixed guide on said tubular member, a dog slidable vertically through said guide and engageable with the notch in the last-named rod for coupling said tubular member and last-named rod together, and an operating lever for the last-named dog pivotally mounted on said tubular member and having an end pivotally connected with the last-named dog.

4. In a surface rod line jack, and in combination with a knock-off post, a guide member fixedly mounted on said knock-off post, a tubular member slidably fitting in said guide member, a rod having one end fixed in said tubular member and provided at said end with a longitudinal series of spaced notches, and said tubular member having a series of openings aligning with the respective notches, a dog slidably mounted for vertical movement on the knock-off post and engageable with a selected one of said notches for securing the tubular member against reciprocatory movement, a second rod having an end slidably engaging in said tubular member and provided at said end with a longitudinal series of notches, a guide carried by said tubular member, and a dog working in said guide and having an end arranged to engage in a selected one of the last-named notches for coupling said tubular member and the last-named rod together.

5. In a surface rod line jack, a knock-off post provided at diametrically opposite sides thereof with openings, and also provided with an integral channel-shaped guide member the opposite end portions of which extend laterally from the knock-off post in the region of said openings, a coupler rod having a sliding fit in said channel guide, means on the knock-off post and on said coupler member for releasably securing the coupler member against longitudinal movement relative to the guide, and means for releasing the coupler member including an operating link pivoted intermediate its ends to said knock-off post, and said knock-off post below said guide being provided with oppositely disposed openings through which one end portion of said operating link extends.

ERNEST LEE McINTYRE.